United States Patent [19]

König et al.

[11] 4,306,037

[45] Dec. 15, 1981

[54] PROCESS FOR THE MANUFACTURE OF ELASTIC POLYURETHANE FOAMS CAPABLE OF BEING FLAME LAMINATED AND HIGH FREQUENCY WELDED

[75] Inventors: Klaus König, Leverkusen; Peter Seifert, Bergisch-Gladbach; Wolfgang Reichmann, Duesseldorf; Hans-Walter Illger, Roesrath; Heinz Müller, Leverkusen, all of Fed. Rep. of Germany

[73] Assignee: Bayer Aktiengesellschaft, Leverkusen, Fed. Rep. of Germany

[21] Appl. No.: 183,538

[22] Filed: Sep. 2, 1980

[30] Foreign Application Priority Data

Sep. 14, 1979 [DE] Fed. Rep. of Germany ....... 2937330

[51] Int. Cl.³ ............................................. C08G 18/14
[52] U.S. Cl. ..................................................... 521/172
[58] Field of Search ......................................... 521/172

[56] References Cited

U.S. PATENT DOCUMENTS 3,205,120 9/1965 Flanders .......................... 161/160
3,467,731 9/1969 Wynstra .......................... 525/129
4,060,439 11/1978 Rosemund et al. ............. 156/78

FOREIGN PATENT DOCUMENTS 889801 1/1972 Canada ............................ 154/71

Primary Examiner—Maurice J. Welsh
Attorney, Agent, or Firm—Gene Harsh; Joseph C. Gil

[57] ABSTRACT

The instant invention is directed to a process for the production of elastic polyurethane foams capable of being flame laminated and high frequency welded, comprising reacting (a) polyisocyanates with
(b) polyethers having a molecular weight of from 400 to 10,000 and having at least two hydroxyl groups and
(c) hydroxy-pivalic acid neopentylglycol ester of the formula:

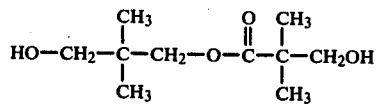

used in a quantity of from 1 to 20% by weight, based on the hydroxyl polyether, in the presence of a blowing agent.

The instant invention is also directed to the polyurethane foams prepared thereby.

4 Claims, No Drawings

PROCESS FOR THE MANUFACTURE OF ELASTIC POLYURETHANE FOAMS CAPABLE OF BEING FLAME LAMINATED AND HIGH FREQUENCY WELDED

BACKGROUND OF THE INVENTION

Foams having urethane groups which are obtained by the reaction of polyisocyanates with polyether and-/or polyester polyols are known and widely used. The possibilities of application, particularly of the polyether foams, are, however, severely restricted in certain fields since they are unsuitable for flame lamination and high frequency (HF) welding. Fields in which these properties are particularly desirable include, for example, the manufacture by flame laminating of composite systems having surface layers of foils and/or textiles. Such composite systems are, in many cases, subsequently contoured and/or shaped by high frequency welding.

It is known that foams which are intrinsically capable of being flame laminated and also to a certain extent high frequency welded can be obtained from polyisocyanates and polyester polyols with the addition of suitable auxiliary agents and additives. These foams can, however, only be produced on special machines and are inferior to polyether-polyurethanes in some of their properties such as the openness of their cells, their elasticity and their resistance to moisture and heat.

It is also known that polyurethane foams capable of being flame laminated and high frequency welded can be prepared from polyether polyols, polyisocyanates, water and/or blowing agents in the presence of emulsifiers, stabilizers, catalyst and other additives by the addition of special auxiliary agents.

U.S. Pat. No. 3,205,120 describes the preparation of flame laminating polyether-polyurethane foams by the addition of a minor quantity of a polyol having a molecular weight of from 200 to 1500. Polyols containing phosphorus such as tris-(dipropylene glycol)-phosphite are said to be particularly suitable. One disadvantage of this process is that processing becomes less reliable and there is a certain tendency for the core of the foam to discolor. Moreover, if conventional quantities are used, the flame laminating characteristics obtained are distinctly inferior to those of a polyester-polyurethane foam.

U.S. Pat. No. 4,060,439 discloses the inclusion in the foam formulations for flexible polyether foams of small quantities of alkylene glycols having from 2 to 8 carbon atoms or the inclusion of triols having from 3 to 10 carbon atoms, of dialkanolamines having from 2 to 10 carbon atoms, or of short chain glycol ethers and of polyvalent phenols. It has been found in practice, however, that the inclusion of such compounds in the foam formulations makes foaming more difficult and provides only a very narrow margin of operation between producing open pores and closed pores.

In view of the disadvantages described above of polyether-polyurethane foams (which explain why polyester-polyurethane foams are mostly used for flame laminating and high frequency welding), there is a great demand for a polyurethane foam which is reliable in production and capable of being flame laminated and high frequency welded.

It has now surprisingly been found that, in contrast to the compounds described in U.S. Pat. No. 4,060,439, hydroxy-pivalic acid neopentylglycol esters included in formulations for the production of flexible polyether-polyurethane foams do not result in closed cells nor in processing difficulties but, rather, give rise to an optimally open-celled elastic flexible foam which has excellent mechanical properties, is very suitable for flame laminating and can also be high frequency welded to a certain extent.

DESCRIPTION OF THE INVENTION

The instant invention is directed to a process for the production of elastic polyurethane foams capable of being flame laminated and high frequency welded, comprising reacting
  (a) polyisocyanates with
  (b) polyethers having a molecular weight of from 400 to 10,000 containing at least two hydroxyl groups and
  (c) a compound used as an additive to render the foam capable of being flame laminated and high frequency welded, in the presence of blowing agents, optionally with the addition of
  (d) chain lengthening agents, catalysts, stabilizers and other known additives, characterized in that component (c) is the hydroxypivalic acid neopentylglycol ester of the formula:

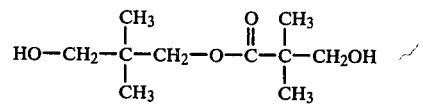

used in a quantity of from 1 to 20% by weight, preferably from 3 to 10% weight, based on the hydroxyl polyether.

The present invention also relates to polyurethane foams obtainable by the above-mentioned process.

The following surprising findings were made:

1. The compound used according to the present invention, which renders the foam capable of being flame laminated and high frequency welded, has the advantage of being chemically fixed and, therefore, evenly distributed in the whole mass of the foam and, at the same time, firmly anchored to the structure of the foam.

2. The compound used according to the present invention is a substance which can be very rapidly and easily mixed with the polyether polyols and other foam components. Rapid and intensive mixing of the components has major advantages. It improves the stability of the foams during their preparation and the foams do not have a tendency to collapse while being formed and are found to have a fine, regular cell structure when the foaming process has been completed.

3. In spite of the chemical incorporation of the compound, which renders the foams capable of being flame laminated and high frequency welded, the mechanical properties of the foams are equal to, and in some important respects even better than, those of a foam produced without such additives.

4. Production of such foams which are capable of flame lamination and high frequency welding may be carried out using machines generally used for the production of polyurethane-polyether foams and, therefore, require no additional technical expenditure.

The following are used for carrying out the process according to the present invention:

1. The following polyisocyanates may be used: aliphatic, cycloaliphatic, araliphatic, aromatic and heterocyclic polyisocyanates such as those described e.g. by W. Siefken in Justus Liebigs Annalen der Chemie, 562, pages 75 to 136, for example those corresponding to the following general formula:

wherein n=2—4, preferably 2, and

Q represents an aliphatic hydrocarbon group having 2–18, preferably 6–10 carbon atoms, a cycloaliphatic hydrocarbon group having 4–15, preferably 5–10 carbon atoms, and an aromatic hydrocarbon group having 6–15, preferably 6–13 carbon atoms, or an araliphatic hydrocarbon group having 8–15, preferably 8–13 carbon atoms.

Examples include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate and any mixtures of these isomers; 1-isocyanato-3,3,5-trimethyl-5-isocyanatomethyl-cyclohexane (German Auslegeschrift No. 1,202,785 and U.S. Pat. No. 3,401,190); 2,4- and 2,6-hexahydrotolylene diisocyanate and any mixtures of these isomers; hexahydro-1,3- and/or -1,4-phenylene diisocyanate; perhydro-2,4'- and/or -4,4'-diphenylmethane diisocyanate; 1,3- and 1,4-phenylene diisocyanate; 2,4- and 2,6-tolylene diisocyanate and any mixtures of these isomers; diphenylmethane-2,4'- and/or -4,4'-diisocyanate and naphthylene-1,5-diisocyanate.

The following may also be used according to the present invention: polyphenyl-polymethylene-polyisocyanates which may be obtained by aniline/formaldehyde condensation followed by phosgenation (British Pat. Nos. 874,430 and 848,671); polyisocyanates having carbodiimide groups (German Pat. No. 1,092,007, U.S. Pat. No. 3,152,162 and German Offenlegungsschriften Nos. 2,504,400; 2,537,685 and 2,552,350); norbornane diisocyanates (U.S. Pat. No. 3,492,330); polyisocyanates having allophanate groups (British Pat. No. 994,890, Belgian Pat. No. 761,626 and Netherlands Published Patent Application No. 7,102,524); polyisocyanates having isocyanurate groups (U.S. Pat. No. 3,001,973, German Pat. Nos. 1,002,789; 1,222,067 and 1,027,394 and German Offenlegungsschriften Nos. 1,929,034 and 2,004,048); polyisocyanates having urethane groups (Belgian Pat. No. 752,261 or U.S. Pat. Nos. 3,394,164 and 3,644,457); polyisocyanates having biuret groups (U.S. Pat. Nos. 3,201,372 and 3,124,605 and British Pat. No. 889,050); polyisocyanates having ester groups (British Pat. Nos. 965,474 and 1,072,956, U.S. Pat. NO. 3,567,763 and German Pat. No. 1,231,688); and polymeric polyisocyanates containing fatty acid esters (U.S. Pat No. 3,455,883).

It is generally preferred to use commercially readily available polyisocyanates such as 2,4- and 2,6-tolylene diisocyanate and any mixtures of these isomers ("TDI"), polyphenyl-polymethylene-polyisocyanates as obtained by aniline/formaldehyde condensation followed by phosgenation ("crude MDI") and polyisocyanates containing carbodiimide groups, urethane groups, allophanate groups, isocyanurate groups or biuret groups ("modified polyisocyanates"), in particular those modified polyisocyanates which are derived from 2,4- and/or 2,6-tolylene diisocyanate or from 4,4'- and/or 2,4'-diphenylmethane diisocyanate.

2. The following polyethers may be used: polyethers having at least two hydroxyl groups, generally having a molecular weight in the range of from 400 to 10,000, in particular polyethers having 2–8 hydroxyl groups, especially those having a molecular weight of from 1,000 to 6,000, but preferably polyethers having from 2 to 4 hydroxyl groups.

The polyethers which are suitable for the purpose of the present invention, having at least 2, generally 2–8, preferably 2 or 3, hydroxyl groups may be prepared for example, by polymerization of epoxides (such as ethylene oxide, propylene oxide, butylene oxide, tetrahydrofuran, styrene oxide or epichlorohydrin) either on their own (e.g. in the presence of Lewis catalysts such as BF$_3$) or by chemical addition of these epoxides (preferably ethylene oxide and propylene oxide, optionally as mixtures or successively) to starting components having reactive hydrogen atoms. Examples of components having reactive hydrogen atoms are water, alcohols, ammonia or amines, e.g. ethylene glycol, propylene glycol-(1,3) or -(1,2); trimethylolpropane; glycerol; sorbitol; 4,4'-dihydroxy-diphenylpropane; aniline; ethanolamine or ethylene diamine. Sucrose polyethers (German Auslegeschriften Nos. 1,176,358 and 1,064,938) and polyethers started on formitol or formose (German Offenlegungsschriften Nos. 2,639,083 and 2,737,951) may also be used according to the present invention. It is, in many cases, preferred to use polyethers which have predominantly primary OH groups (up to 90% by weight, based on all the OH groups in the polyether). Polybutadienes having OH groups are also suitable for the purpose of the present invention. Polythioethers or polyacetals having a molecular weight of from 400 to 10,000 and having at least two hydroxyl groups may also be included according to the present invention (up to 50% by weight, based on the polyether).

Suitable polythioethers include, in particular, the condensation products obtained by reacting thiodiglycol on its own and/or with other glycols, dicarboxylic acids, formaldehyde, aminocarboxylic acids or aminoalcohols. The products obtained may be, for example, polythio mixed ethers, polythio ether esters or polythio ether ester amides, depending on the co-components. Suitable polyacetals include, e.g. the compounds prepared from glycols such as diethylene glycol, triethylene glycol, 4,4'-dioxethoxydiphenyl-dimethylmethane, hexanediol and formaldehyde. Polyacetals suitable for the purpose of the present invention may also be prepared by the polymerization of cyclic acetals such as trioxane (German Offenlegungsschrift No. 1,694,128).

Polyethers containing high molecular weight polyadducts or polycondensates or polymers in a finely dispersed or dissolved form may also be used according to the present invention. Such polyethers may be obtained, for example, by carrying out polyaddition reactions (e.g. reaction between polyisocyanates and amino functional compounds) or polycondensation reactions (e.g. between formaldehyde and phenols and/or amines) in situ in the above-mentioned hydroxyl polyethers. Processes of this type have been described, for example, in German Auslegeschriften Nos. 1,168,075 and 1,260,142 and German Offenlegungsschriften Nos. 2,324,134; 2,423,984; 2,512,385; 2,513,815; 2,550,796; 2,550,797; 2,550,833; 2,550,862; 2,633,293 and 2,639,254. Alternatively, these polyethers may be obtained by a process according to U.S. Pat. No. 3,869,413 or German Offenlegungsschrift No. 2,550,860 consisting of mixing a previously prepared aqueous polymer dispersion with a polyhydroxyl compound and then removing the water from the mixture.

Polyether compounds which have been modified with vinyl polymers are also suitable for the process according to the present invention, e.g. the compounds obtained by the polymerization of styrene and acrylonitrile in the presence of polyethers (U.S. Pat. Nos. 3,383,351; 3,304,273; 3,523,093 and 3,110,695 and German Auslegeschrift No. 1,152,536) or polycarbonate polyols (German Pat. No. 1,769,795 or U.S. Pat. No. 3,637,909). Synthetic products having exceptional flame resistance are obtained by using polyether polyols which have been modified according to German Offenlegungsschriften Nos. 2,442,101; 2,644,922 and 2,646,141 by graft polymerization with vinyl phosphonic acid esters and optionally (meth)acrylonitrile, (meth) acrylamide or OH functional (meth)acrylic acid esters. Polyhydroxyl ethers into which carboxyl groups have been introduced by radical graft polymerization with unsaturated carboxylic acids and optionally other olefinically unsaturated monomers (German Offenlegungsschriften Nos. 2,714,291; 2,739,620 and 2,654,746) are particularly advantageous to use in combination with mineral fillers.

Polyurethanes having substantially improved mechanical properties are, in many cases, obtained by the inclusion of modified polyethers of the type mentioned above.

Representatives of the compounds to be used according to the present invention are also described in, for example, High Polymers, Volume XVI, "Polyurethanes: Chemistry and Technology", by Saunders-Frisch, Interscience Publishers, New York, London, Volume I, 1962, pages 32-42 and 44-54 and Volume II, 1964, pages 5-6 and 198-199, and in Kunststoff-Handbuch, Volume VII, Vieweg-Hochtlen, Carl-Hanser-Verlag, Munich, 1966, e.g. on pages 45-71. Mixtures of the above-mentioned compounds may, of course, also be used.

3. Compounds having at least two isocyanate-reactive hydrogen atoms and a molecular weight of 32-400 may optionally also be used as starting components. These may be compounds containing hydroxyl groups and/or amino groups and/or thiol groups and/or carboxyl groups, but they are preferably compounds having hydroxyl groups and/or amino groups and generally have from 2-8, preferably 2-4, isocyanate-reactive hydrogen atoms. These chain lengthening or cross-linking agents may also be used in the form of mixtures.

4. According to the present invention, the hydroxypivalic acid neopentylglycol ester corresponding to the formula:

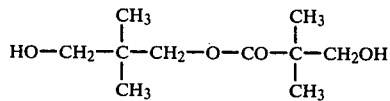

is used in the quantities already indicated. The compound is known.

5. The following blowing agents are used: water and/or readily volatile inorganic or organic compounds. Examples of suitable organic blowing agents include acetone, ethyl acetate, halogen-substituted alkanes such as methylene chloride, chloroform, ethylidene chloride, vinylidene chloride, monofluorotrichloromethane, chlorodifluoromethane and dichlorodifluoromethane; also butane, hexane, heptane and diethylether. Examples of suitable inorganic blowing agents include air, $CO_2$ and $N_2O$. The effect of a blowing agent may also be obtained by the addition of compounds which decompose at a temperature above room temperature to liberate gases, e.g. nitrogen. Examples of such compounds include azo compounds such as azodicarbonamide and isobutyric acid nitrile. Other examples of blowing agents and details concerning the use of blowing agents may be found in Kunststoff-Handbuch, Volume VII, published by Vieweg-Hochtlen, Carl-Hanser-Verlag, Munich 1966, e.g. on pages 108 and 109, 453 to 455 and 507 to 510.

6. The following catalysts, stabilizers and other additives may optionally also be used: tertiary amines such as triethylamine; tributylamine; N-methylmorpholine; N-ethylmorpholine; N,N,N',N'-tetramethylethylenediamine; pentamethyldiethylene triamine and higher homologs (German Offenlegungsschriften Nos. 2,624,527 and 2,624,528); 1,4-diazabicyclo-(2,2,2)-octane; N-methyl-N'-dimethylaminoethylpiperazine; bis-(dimethylaminoalkyl)-piperazine (German Offenlegungsschrift No. 2,636,787); N,N-dimethylbenzylamine; N,N-dimethylcyclohexylamine; N,N-diethylbenzylamine; bis-(N,N-diethylaminoethyl)-adipate; N,N,N',N'-tetramethyl-1,3-butanediamine; N,N-dimethyl-phenylethylamine; 1,2-dimethylimidazole; 2-methylimidazole; monocyclic and bicyclic amidines (German Offenlegungsschrift No 1,720,633); bis-(dialkylamino)-alkyl ethers (U.S. Pat. No. 3,330,782, German Auslegeschrift No. 1,030,558 and German Offenlegungsschriften Nos. 1,804,361 and 2,618,280); and tertiary amines having amide groups (preferably formamide groups) according to German Offenlegungsschriften Nos. 2,523,633 and 2,732,292. The known Mannich bases of secondary amines such as dimethylamine and aldehydes, preferably formaldehyde, or ketones such as acetone, methyl ethyl ketone or cyclohexanone and phenols such as phenol, nonylphenol or bisphenol may also be used as catalysts.

Tertiary amines having isocyanate-reactive hydrogen atoms used as catalysts include, for example, triethanolamine; triisopropanolamine; N-methyldiethanolamine; N-ethyldiethanolamine; N,N-dimethylethanolamine; their reaction products with alkylene oxides such as propylene oxide and/or ethylene oxide and secondary tertiary amines according to German Offenlegungsschrift No. 2,732,292.

Silaamines having carbon-silicon bonds as described e.g. in German Pat. No. 1,229,290 (corresponding to U.S. Pat. No. 3,620,984) may also be used as catalysts, e.g. 2,2,4-trimethyl-2-silamorpholine and 1,3-diethylaminomethyl-tetramethyl-disiloxane.

Basic nitrogen compounds such as tetraalkylammonium hydroxide and alkali metal hydroxides (such as sodium hydroxide), alkali metal phenolates (such as sodium phenolate) and alkali metal alcoholates (such as sodium methylate) may also be used as catalysts. Hexahydrotriazines are also suitable catalysts (German Offenlegungsschrift No. 1,769,043).

The reaction between isocyanate groups and Zerewitinoff-active hydrogen atoms is greatly accelerated by lactams and azalactams, an associate compound being first formed between the lactam and the compound containing acidic hydrogen. Such associates and their catalytic action are described in German Offenlegungsschriften Nos. 2,062,288; 2,062,289; 2,117,576 (U.S. Pat. No. 3,758,444); 2,129,198; 2,330,175 and 2,330,211.

Organic metal compounds may also be used as catalysts according to the invention, particularly organo-tin compounds. These organo-tin compounds include not only compounds containing sulfur such as di-n-octyl-tin mercaptide (German Auslegeschrift No. 769,367 or U.S. Pat. No. 3,645,927) but also, in particular, tin(II) salts of carboxylic acids such as tin(II) acetate, tin(II) octoate, tin(II) ethyl hexoate and tin(II) laurate as well as tin(IV) compounds (such as dibutyl tin oxide, dibutyl tin dichloride, dibutyl tin diacetate, dibutyl tin dilaurate, dibutyl tin maleate or dioctyl tin diacetate).

All the catalysts mentioned above may, of course, also be used as mixtures. It is particularly interesting to use combinations of organic metal compounds with amidines, aminopyridines or hydrazinopyridines (German Offenlegungsschriften Nos. 2,434,185; 2,601,082 and 2,603,834).

Other representatives of catalysts which may be used according to the present invention and the action of the catalysts are described in Kunststoff-Handbuch, Volume VII, published by Vieweg-Hochtlen, Carl-Hanser-Verlag, Munich, 1966, e.g. pages 96 to 102.

The catalysts are generally used in a quantity of about 0.001 to 10% by weight, based on the total quantity of polyethers having at least two hydroxyl groups. Suitable emulsifiers include e.g. the sodium salts of castor oil sulfonates or salts of fatty acids with amines such as oleic acid diethylamine or stearic acid diethanolamine. Alkali metal and ammonium salts of sulfonic acids (such as dodecylbenzene sulfonic acid or dinaphthylmethane disulfonic acid) or of fatty acids (such as ricinoleic acid) or of polymeric fatty acids may be used as surface active additives.

Particularly suitable foam stabilizers are the polyether siloxanes, especially those which are water-soluble. These compounds generally have a polydimethyl siloxane group attached to a copolymer of ethylene oxide and propylene oxide. Foam stabilizers of this type have been described, e.g. in U.S. Pat. Nos. 2,834,748; 2,917,480 and 3,629,308. It is in many cases of particular interest to use polysiloxane-polyoxyalkylene copolymers which are branched through allophanate groups, as described in German Offenlegungsschrift No. 2,558,523.

Reaction retarders, e.g. compounds which are acidic such as hydrochloric acid or organic acid halides may optionally be added. Also, cell regulators such as paraffins or fatty alcohols or dimethylpolysiloxanes, and pigments or dyes and flame retarding agents (e.g. trischloroethylphosphate, tricresylphosphate and ammonium phosphate and polyphosphate) may be present. Also, stabilizers against aging and weathering, plasticizers, fungistatic and bacteriostatic substances and fillers (such as barium sulfate, kieselguhr, carbon black or whiting) may be present.

Other examples of surface active additives, foam stabilizers, cell regulators, reaction retarders, stabilizers, flame retarding substances, plasticizers, dyes, fillers and fungistatic and bacteriostatic substances which may be used according to the present invention and details concerning their use and action may be found in Kunststoff-Handbuch, Volume VII, published by Vieweg and Hochtlen, Carl-Hanser-Verlag, Munich 1966, e.g. on pages 103 to 113.

PROCEDURE FOR CARRYING OUT THE PROCESS ACCORDING TO THE PRESENT INVENTION:

According to the present invention, the starting materials are reacted together by the one-shot process, prepolymer process or semiprepolymer process, in many cases using mechanical devices such as those described in U.S. Pat. No. 2,764,565. Details concerning processing apparatus suitable for the process according to the present invention may be found in Kunststoff-Handbuch, Volume VII, published by Vieweg and Hochtlen, Carl-Hanser-Verlag, Munich 1966, e.g. on pages 121 to 205. The index (molar ratio of the NCO-groups to total of active hydrogen) is in general between 1 to 1,1.

Production of the foam according to the present invention may be carried out in closed molds, in which case, the reaction mixture is introduced into a mold made of a metal, e.g. aluminum, or of a synthetic material, e.g. an epoxide resin. The reaction mixture foams up inside the mold to form the shaped product. This process of foaming in the mold may be carried out to produce an article having a cellular structure on its surface or it may be carried out to produce an article having a compact skin and a cellular core. According to the present invention, the desired result may be obtained in the one case by introducing just sufficient reaction mixture to enable the foam subsequently produced to fill the mold and in the other case by introducing a larger quantity of foamable reaction mixture than is necessary for filling the interior of the mold with foam. The latter method is known as overcharging, a procedure which has been disclosed, e.g. in U.S. Pat. Nos. 3,178,490 and 3,182,104.

When foaming in molds, it is customary to use so-called "external mold release agents" such as silicone oils but one may also use so-called "internal mold release agents", optionally together with "external mold release agents". Such mold release agents have been disclosed, e.g. in German Offenlegungsschriften Nos. 2,121,670 and 2,307,589.

Cold setting foams may also be produced according to the invention (see British Pat. No. 1,162,517 and German Offenlegungsschrift No. 2,153,086).

Foams may, of course, also be produced by the process of block foaming or by the laminator process.

The following Examples serve to illustrate the process according to the present invention.

EXAMPLES

EXAMPLE 1

Flexible foam blocks are produced on a continuously operating high pressure machine, type UBT(Hennecke, Birlinghoven, Siegkreis, Federal Republic of Germany). Foam formulations consisting of polyol mixtures having increasing proportions of hydroxy-pivalic acid neopentylglycol esters are listed in Table I which also gives the mechanical data of the resulting foams.

TABLE I

|  | 1.2 | 1.1 | 1.3 | 1.3 | 1.5 |
| --- | --- | --- | --- | --- | --- |
| Parts by weight of a polyether obtained from a starting mixture of 90% glycerol and 10% dipropylene glycol and a mixed block of 10% ethylene oxide and 90% propylene oxide, over 95% secondary OH groups (OH number: 45) | 100 | 97 | 95 | 92 | 90 |

TABLE I-continued

|  | 1.2 | 1.1 | 1.3 | 1.3 | 1.5 |
|---|---|---|---|---|---|
| Parts by weight of hydroxy-pivalic acid neopentylglycol ester | 0 | 3.0 | 5.0 | 8.0 | 10 |
| Parts by weight of water | 2.5 | 2.5 | 2.5 | 2.5 | 2.5 |
| Parts by weight of a commercial stabilizer for flexible foam (polyalkylene glycol-polysiloxane block copolymer) | 0.7 | 0.7 | 0.7 | 0.7 | 1.0 |
| Parts by weight TDI (tolylene diisocyanate, mixture of 2,4- and 2,6-diisocyanato-toluene in proportions by weight of 80:20) | 33.7 | 36.2 | 37.8 | 40.2 | 42.0 |
| Isocyanate index | 105 | 105 | 105 | 105 | 105 |
| Dimethylethanolamine | 0.6 | 0.5 | 0.5 | 0.5 | 0.5 |
| Commercial amine activator (PS 207, Bayer AG) | 0.15 | 0.15 | 0.15 | 0.15 | 0.15 |
| Tin(II) octoate | 0.2 | 0.15 | 0.1 | 0.1 | 0.05 |
| Gross density (kg/m$^3$) | 38 | 36 | 36 | 36 | 36 |
| Tensile strength (k Pa) | 105 | 120 | 145 | 150 | 180 |
| Elongation at break (%) | 190 | 230 | 325 | 335 | 365 |
| Compression strength, 40% (k Pa) | 3.95 | 3.40 | 3.4 | 3.1 | 3.1 |
| Pressure deformation residue 90% (%) | 3.8 | 3.4 | 4.5 | 6.3 | sticks |

All foams obtained are open-celled and free from any defects. Their ability to be flame laminated and HF welded improves with increasing quantities of hydroxy-pivalic acid neopentylglycol ester.

EXAMPLE 2

Flexible foam blocks are produced by the process described in Example 1, using a constant proportion of hydroxy-pivalic acid neopentylglycol ester. The foam formulations and mechanical data of foams obtained are shown in Table II.

The foams are open-celled and free from any defects. Their ability to be flame laminated and HF welded improves with increasing unit weight, i.e. the amount burned down is reduced and bonding is improved.

EXAMPLE 3

Flexible foam blocks are produced by the process described in Example 1, using in each case 5% solutions of hydroxy-pivalic acid neopentylglycol ester in various polyether polyols. The foam formulations and mechanical data of the foams obtained are shown in Table III.

TABLE II

|  | 2.1 | 2.2 | 2.3 |
|---|---|---|---|
| Parts by weight of the polyether from Example 1 | 95 | 95 | 95 |
| Parts by weight of hydroxy-pivalic acid neopentylglycol ester | 5 | 5 | 5 |
| Parts by weight of water | 2.5 | 4.0 | 4.8 |
| Parts by weight of a commercial flexible foam stabilizer (polyalkylene glycol-polysiloxane block copolymer) | 0.8 | 1.0 | 1.2 |
| Parts by weight of TDI (80% 2,4- and 20% 2,6-tolylene diisocyanate) | 38.0 | 53.7 | 62.2 |
| Isocyanate index | 105 | 105 | 105 |
| Dimethylethanolamine | 0.5 | 0.3 | 0.15 |
| Commercial amine activator (PS 207 of Bayer AG) | 0.15 | 0.15 | 0.15 |
| Tin(II) octoate | 0.12 | 0.15 | 0.15 |
| Gross density (kg/m$^3$) | 37 | 26 | 22 |
| Tensile strength (k Pa) | 140 | 135 | 125 |
| Elongation at break (%) | 395 | 240 | 230 |
| Compression strength, 40% (k Pa) | 3.3 | 3.65 | 3.75 |
| Pressure deformation residue, 90% (%) | 3.6 | 5.9 | 9.9 |
| Loss of compression strength after Ford test (%) | 18 | 14 | 16 |
| Pressure deformation residue after Ford test (%) | 18 | 14 | 13 |

TABLE III

|  | 3.1 | 3.2 | 3.3 |
|---|---|---|---|
| Parts by weight of the polyether from Example 1 (OH number: 45) | 95 | — | — |
| Parts by weight of a polyether started on trimethylolpropane with 100 parts by weight of propylene oxide, over 97% secondary OH groups (OH number: 56) | — | 95 | — |
| Parts by weight of a polyether started on trimethylolpropane with 87 parts by weight propylene oxide and 13 parts of ethylene oxide end groups, over 60% primary OH groups (OH number: 35) | — | — | 95 |
| Hydroxy-pivalic acid neopentylglycol ester | 5 | 5 | 5 |
| Parts by weight of water | 2.5 | 2.5 | 2.5 |
| Parts by weight of a commercial flexible foam stabilizer (polyalkylene glycol-polysiloxane block copolymer) | 0.8 | 0.9 | 0.6 |
| Parts by weight of TDI (80% 2,4- and 20% 2,6-tolylene diisocyanate) | 38.0 | 39.4 | — |
| Parts by weight of TDI (65% 2,4- and 35% 2,6-tolylene diisocyanate) | — | — | 36.1 |
| Isocyanate index | 105 | 105 | 105 |
| Dimethylethanolamine | 0.5 | 0.2 | — |
| Commercial amine activator (PS 207 of Bayer AG) | 0.15 | 0.2 | 0.25 |
| Tin(II) octoate | 0.12 | 0.15 | 0.10 |
| Gross density (kg/m$^3$) | 37 | 36 | 39 |
| Tensile strength (k Pa) | 140 | 125 | 110 |

TABLE III-continued

|  | 3.1 | 3.2 | 3.3 |
|---|---|---|---|
| Elongation at break (%) | 395 | 290 | 210 |
| Compression strength, 40% (k Pa) | 3.3 | 3.5 | 4.6 |
| Pressure deformation residue, 90% (%) | 3.6 | 2.9 | 4.2 |
| Loss of compression strength after Ford test (%) | 18 | 16 | 23 |
| Pressure deformation residue after Ford test (%) | 18 | 21 | 26 |

All the foams are open-celled and free from defects. Varying the basic polyol does not alter the flame laminating or HF welding characteristics.

What is claimed is:

1. A process for the production of elastic polyurethane foams capable of being flame laminated and high frequency welded, comprising reacting
   (a) polyisocyanates with
   (b) polyethers having a molecular weight of from 400 to 10,000 and having at least two hydroxyl groups and
   (c) hydroxy-pivalic acid neopentylglycol ester of the formula:

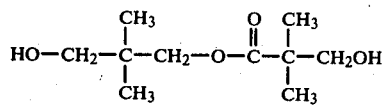

used in a quantity of from 1 to 20% by weight, based on the hydroxyl polyether, in the presence of a blowing agent.

2. The process of claim 1, further comprising chain lengthening agents, catalysts and/or stabilizers.

3. The process of claim 1, wherein said hydroxy-pivalic acid neopentylglycol ester is used in a quantity of 3 to 10% by weight, based on the hydroxyl polyether.

4. Polyurethane foams prepared by the process of claim 1.